Oct. 20, 1953  J. R. MacKAY  2,656,526
CHLORINE CONCENTRATION SENSITIVE APPARATUS
Filed Jan. 7, 1950
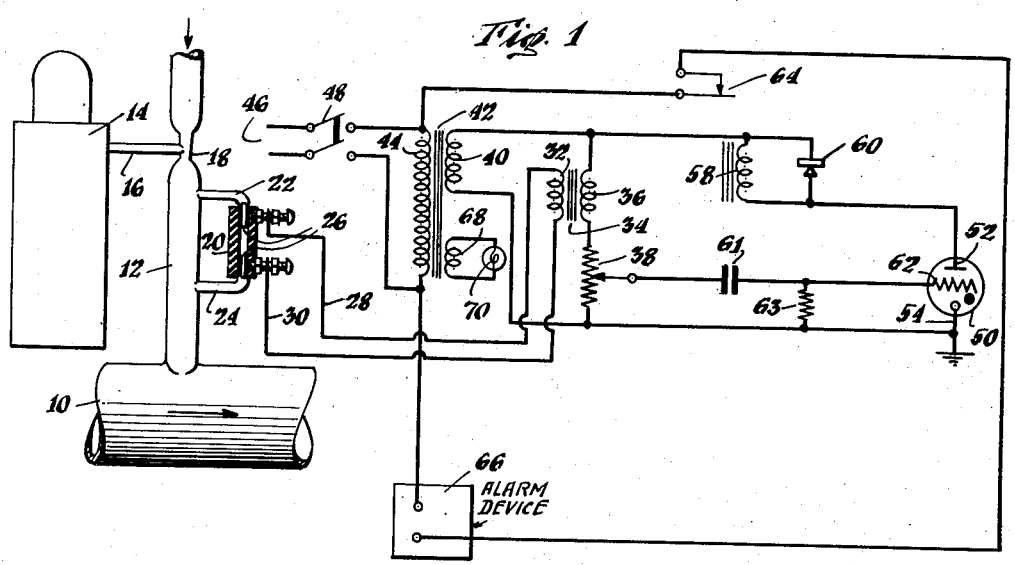
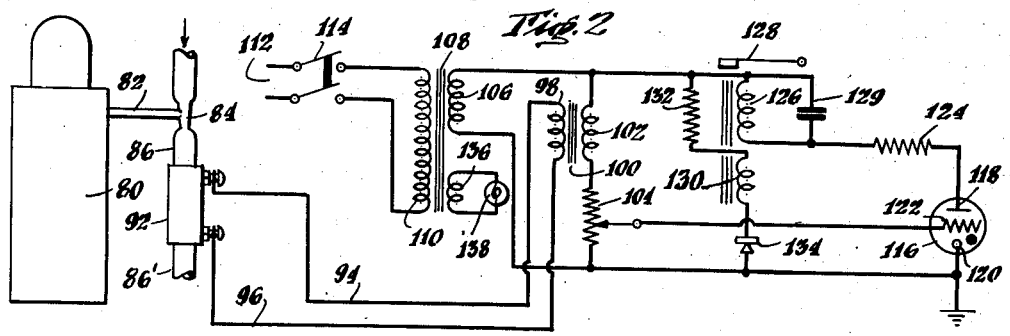
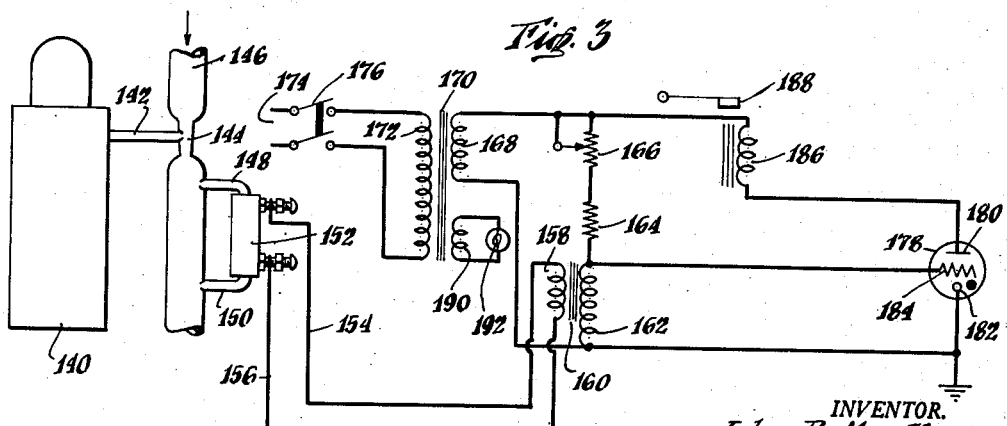
INVENTOR.
John R. MacKay
BY Robert S. Dunham
ATTORNEY

Patented Oct. 20, 1953

2,656,526

UNITED STATES PATENT OFFICE 2,656,526

CHLORINE CONCENTRATION SENSITIVE APPARATUS

John R. MacKay, Packanack Lake, N. J., assignor to Wallace & Tiernan Company, Inc., a corporation of New Jersey Application January 7, 1950, Serial No. 137,324

8 Claims. (Cl. 340—236)

This invention relates to chlorine concentration limit sensitive means for a chlorinating system and more particularly to an apparatus for use in connection with a chlorine injection system for the chlorination of aqueous liquids, to provide suitable indication when the chlorine supplied to the liquid under treatment falls below a predetermined limiting value. More generally, the invention affords novel apparatus for detecting departure of chlorine concentration from a given limit, and also for effecting a signal or other response to the detected departure.

Chlorinating systems are now in common use for chlorinating drinking water and also for chlorinating sewage, both of which are aqueous in character, such systems using apparatus such, for example, as that disclosed in the United States Patent No. 2,482,078 of Charles F. Wallace, granted September 13, 1949. In systems of this character, gaseous chlorine may be supplied to a continuous and substantially constant flowing stream of water to make up a relatively very concentrated solution of chlorine in the water, and this solution in turn added to a much larger body of the aqueous liquid to be chlorinated. Suitable means are usually provided for adjusting the rate of supply of chlorine to the stream of water to a value corresponding to the requirements for chlorine of the system, i. e., of the liquid to be chlorinated, this control being effected both in proportion to the rate of flow of the liquid to be chlorinated and the requirements for chlorine of that liquid, for example, its expected sterilization demand. However, as sometimes happens, the chlorine supply, which is usually from one or more cylinders of this gas, becomes exhausted or for other reasons the flow of chlorine into the chlorinating means may be interrupted or restricted to a value which is much too low to afford adequate and proper chlorination. Inasmuch as adequate chlorination is associated with the health of the community operating the system, it becomes very important to provide immediate notification to the operators of the system whenever the supply rate is too low, so that corrective measure may be promptly taken. For this reason, the major field of utility for the present limit-responsive indicating apparatus will be in the provision of low limit indication, though it can also, in modified form, be used to provide a high limit indication.

Various methods and apparatus have been worked out to detect the amount of chlorine in aqueous liquids subsequent to the chlorination thereof, and particularly subsequent to the point at which chlorine is added and has had an opportunity to be effective, so that only the residual chlorine is detected. However, in such systems, the amount of residual chlorine is quite low, in the order of magnitude of one part per million or less, so that the chlorine-sensitive means be of particular types and highly sensitive in character. In the above identified patent, means were provided which were responsive to the relatively high concentration of chlorine in the relatively small stream of water (in practice, a chlorine concentration in the order of magnitude of 200 to 3000 parts per million) to which stream the chlorine is customarily first introduced and which is then added to the aqueous liquids to be chlorinated, such means being of different and of much simpler character than the conventional indicators and hence less liable to get out of order.

The present preferred embodiment of the instant invention as illustrated in the drawings provides an improved device (employing the basic system embraced by the cited patent) having increased range and, at least, equal sensitivity as compared with the specific device shown as example in the cited patent. Furthermore, there is an elimination of delicate contents, greater immunity to vibration due to a reduction in the number of moving parts and provision of a device substantially unaffected by stray magnetic fields.

This invention may be briefly described as a chlorine responsive system including a novel and improved electrical circuit responsive to the conductivity changes in the high concentration path of a chlorination system of the type above described.

An object of this invention is to provide a chlorine-responsive system including an improved electrical circuit responsive to the changes in chlorine concentration.

Another object of this invention is to provide a system of the character set forth, wherein the chlorine-sensitive means is simple in character and is little, if at all, subject to getting out of order, and an associated electric circuit which will provide a sensitive indication of variations in chlorine concentration from a predetermined limiting value.

A further object of the invention is the provision of an improved electrical circuit responsive to the changes in conductivity of an aqueous medium induced by changes in the chemical content thereof.

A further object of the invention is the provision of a chlorine responsive system including an electrical circuit responsive to conductivity changes in the high chlorine concentration stream of a chlorination system, that is simple and inexpensive in construction and efficient and long-lived in operation.

Other objects and advantages of this invention will become apparent from the following specification and appended claims, when considered in connection with the drawings in which:

Fig. 1 is an illustration of the system embodying the presently preferred electric circuit;

Fig. 2 illustrates an alternative electric circuit; and

Fig. 3 illustrates another alternative electric circuit.

The chlorine concentration limit indicator is shown as applied to a chlorine injection system which may be of the type shown in the aforesaid Patent No. 2,482,078. In accordance with the disclosure of that patent, aqueous liquid to be chlorinated may pass through a large main 10, in the direction of the arrow, as shown. There is also provided a branch pipe 12, usually in the form of a rubber hose, to the main 10, means being provided for adding to this stream of water a substantial concentration of chlorine, many times that required for the liquid in the main 10. The stream of water passing through the pipe 12 may come from any suitable source (not shown) and preferably is maintained at a constant rate, variations in demand for chlorine due to variations in either the rate of flow of the liquid through the main 10, or the variable demands of that liquid for chlorine, or both, being compensated for by varying the concentration of chlorine in the water flowing through the pipe 12. This chlorine is supplied from a chlorinator generally indicated at 14, chlorine being supplied from the chlorinator 14 through a pipe 16, to the throat portion 18 of an aspirator or injector in the pipe 12.

It has been found that the concentration of chlorine in the pipe 12 is a proper condition to use as an index for determining when the chlorine being supplied is below a predetermined desired value and hence, in accordance with the present invention, this concentration is used as the controlling condition.

By passing a predetermined portion or all of the liquid of the stream of water flowing through the pipe 12 on the down stream side of the injector throat 18 therein, through a chlorine sensitive cell, a good indication is had, based upon variations in the electrical conductivity of this liquid. This conductivity for concentrated aqueous solutions of chlorine is sufficiently indicative of that concentration to afford an accurate indication thereof. Very small concentrations of chlorine of the order of magnitude of the residual chlorine in the main 10 do not have a sufficiently representative or sensitive effect upon the electrical conductivity of the liquid to give an accurate indication of the concentration thereof. Furthermore, in the case of sewage, there are so many other factors present affecting the electrical conductivity that changes in conductivity due to minor concentrations of chlorine are masked. As shown, therefore, there is provided a cell, generally indicated at 20, which is connected by by-pass passages 22 and 24, usually of rubber hose, to spaced points along the pipe 12. When the pipe 12 is of metal or other electrically conducting material, the passages 22 and 24 are made from rubber hose or some other electrical insulator and are of sufficient length and reduced internal diameter as to provide a solution path of very low electrical conductivity compared to the conductivity range of the cell 20.

The cell 20 is very simple in character and comprises merely a pair of similar nipples 26 of some metal which is a good electrical conductor and which is comparatively inert to chlorine and to aqueous solutions thereof, such as silver, interposed in spaced relation in a non-conducting tubular casing which may be hard rubber or some electrically nonconducting organic plastic material. The nipples 26, which are spaced apart, as shown in the cell 20, are connected through lead wires 28 and 30 to the secondary winding 32 of a stepdown transformer 34. The high impedance primary winding 36 of the transformer 34 is connected in series with a potentiometer 38 across the secondary winding 40 of an isolation transformer 42. The primary winding 44 of the isolation transformer 42 is connected to a suitable source of alternating current such as the A. C. line 46, through a suitable switch 48.

Through the above described connections, alternating current is caused to flow through the circuit including the secondary winding of the transformer 34 and the cell 20, this type of current being preferred so as to prevent or minimize polarization of the electrodes which might occur if direct current were used.

Connected in parallel with the high impedance primary winding 36 of the transformer 34 and the potentiometer 38, and across the secondary winding 40 of the isolation transformer 42, is an electronic tube 50 having an anode or plate 52 and a cathode 54 which may be grounded to the chassis or case as shown. Included in series in the plate circuit of the tube 50 (which extends to the common side of the primary winding 36 and the secondary winding 40) is a winding of an electromagnetic translating device, e. g. a relay energizing coil 58. The relay coil 58 is paralleled by a rectifier 60, e. g. a half-wave selenium rectifier arranged to conduct current, relative to the plate-cathode path of the tube 50, only in the direction in which the tube is substantially non-conducting. Through a small condenser 61, the grid or control electrode 62 of the tube 50 is connected to the movable arm of the potentiometer 38, the cathode 54 being connected to the common side of the potentiometer resistance and the secondary 40. A grid-cathode resistor 63 of appropriately high value is connected directly between the grid 62 and the cathode 54.

Although the system is fully operative with the grid 62 connected directly to the potentiometer arm and without the elements 61, 63, it is found that if by mischance the cell 20 is short-circuited and at the same time the arm of the potentiometer is placed in its most positive (uppermost) position, sufficient current might flow in the grid circuit to exceed the rating of the tube 50. This condition may be aggravated by the unilateral conducting action of the grid, tending to produce a flow of unidirectional current through the transformer winding 36 and thus to saturate its core and reduce its impedance further. While the stated conditions of the cell and potentiometer are abnormal in proper use, full safety from excess current is achieved by including a limiting resistor or, as shown at 61, a condenser in the grid lead of the tube; when a condenser is used, the leak resistor 63 is employed to provide a conductive path between grid and cathode.

The tube 50 is preferably a cold cathode glow discharge type gas triode, as a tube of this type will meet normal sensitivity requirements and will avoid need for the heater or filament current supply that would be required if a hot cathode type tube was substituted therefor. As included in the circuit, the tube 50 is biased so as to become non-conducting when the chlorine concentration of the solution flowing through the cell 20 is less than a predetermined minimum and to be conducting when the chlorine concentration is at or in excess of that minimum. Since alternating potential is applied to the plate 52, the tube 50 will conduct during the positive half cycles of said applied potential and is substantially non-conducting during the negative half cycles, so that a pulsating current will flow through the relay energizing coil 58.

Although substantial maintenance of the coil 58 in an energized condition during non-conducting half cycles can be achieved by shunting it with a condenser instead of the rectifier 60 (such arrangement, with a necessary series limiting resistor, being shown in Fig. 2), a notably lower anode current through the tube 50, and thus a longer operating life for the tube, is obtainable with the illustrated arrangement using the rectifier 60 to effectuate energization of the coil during the non-conducting half cycles. For the last-mentioned purpose, the rectifier provides a path through which the E. M. F. developed by the collapsing magnetic field of the relay can discharge during each negative half cycle when the tube 50 is substantially non-conducting. The resulting effect is comparable to substantially continuous energization of the relay.

When the switch 48 is closed, power is applied to the circuit and a voltage is induced in the secondary winding 32 of the stepdown transformer 34. If the conductivity of the liquid flowing in the cell 20 is within predetermined values, the impedance of the cell 20 will be sufficiently low to permit an amount of current to flow in the circuit, including the secondary winding 32 and said cell 20, to materially lower the effective impedance of the primary winding 36. This decrease in effective impedance of the primary winding 36 will result in an increase in the potential upon the grid 62 in phase with the potential upon the plate 52, which will increase the grid current of the tube 50. When this current becomes of sufficient magnitude for transition of the glow discharge to the anode 52, the tube 50 will conduct and current will flow through the relay energizing coil 58 on each positive half cycle of the applied plate potential. The energization of the relay coil 58 will open the normally closed relay contacts 64.

The value of current that must flow through the cell 20 to maintain the tube 50 in a conducting state is determined by the setting of the potentiometer 38. Any material decrease in concentration will result in a material increase in the impedance of the cell 20. This increase in impedance of the cell 20 results in a decrease in current flow in the secondary winding 32. This decrease in current flow in the secondary winding 32 raises the effective impedance of the primary winding 36 and results in a decrease in current flow therethrough. The decrease in current flowing in the primary winding 36 causes a corresponding drop in the potential across the potentiometer 38 which lowers the potential on the grid 62 and cuts the tube 50 off, providing the potentiometer 38 was set at a value which will just maintain tube conduction at the predetermined minimum chlorine concentration in the solution flowing through the cell 20. When the tube 50 cuts off, the current flow through the relay energizing coil 38 and the current limiting resistor 56 ceases and the relay coil 58 becomes deenergized. The deenergization of the relay coil 58 causes closure of the relay contacts 64 which complete a circuit to a suitable alarm device 66 connected across the primary 44 of the isolation transformer 42. The isolation transformer 42 is provided with an additional secondary winding 68 connected in series with an indicator light 70 to show when the power is on.

In the above described circuit, the tube 50 is normally in a conducting state while the chlorine concentration is above the predetermined low limit and the contacts 64 for the alarm circuit are open. The contacts 64 will close to actuate the alarm device 66 if the chlorine concentration falls below the predetermined low limit. The alarm device 66 will also be actuated if the tube fails to conduct for any other reason. Thus if the device becomes inoperative due to tube operating failure, the alarm device 66 provides an instantaneous indication thereof. By connecting the alarm device 66 and relay contacts 64 in series with a battery, in lieu of connecting to the line 46, an aural indication of power failure will be obtained. When a battery is used, the switch 48 may be provided with a third set of contacts for interrupting the battery circuit when the switch is thrown to its "off" position.

While the alarm device 66 has been described as affording an aural indication and thus as comprising a buzzer, bell, horn or the like, it may also or alternatively comprise a visible alarm, e. g. a signal lamp. Indeed it will now be seen that the illustrated apparatus affords peculiarly efficient means for effecting a circuit-controlling operation of any desired character and purpose, in response to departure of the chlorine concentration of the stream in the conduit 12 from a predeterminable limit.

Fig. 2 illustrates an alternative embodiment of the invention, including an alternative electric circuit responsive to the changes in chlorine concentration. As described above, with relation to Fig. 1, there is provided a chlorinator 80 connected by a suitable passage, such as 82, to the throat 84 of an injector which discharges into a rubber hose 86. The hose 86 is connected to one end of a conductivity cell 92. A rubber hose 86' is connected to the other end of the cell 92 and to a main (not shown) containing the main body of liquid to be chlorinated. The cell 92 is similar in construction to the cell 20 in Fig. 1, except that it may be of increased internal diameter and electrode spacing.

The conductivity cell 92 is connected through the leads 94 and 96 to the secondary winding 98 of a stepdown transformer 100. The high impedance primary 102 of the transformer 100 is connected in series with a potentiometer 104 across the secondary winding 106 of an isolating transformer 108. The primary winding 110 of the isolating transformer 108 is connected to a suitable source of alternating potential such as the A. C. line 112 through a switch 114. Through the above described connections alternating current is caused to flow through the circuit including the secondary winding 98 of the transformer 100 and the cell 92, this type of current being preferred, as in Fig. 1, so as to present polarization of the electrodes which might occur if direct current were used.

Connected in parallel with the series circuit including the primary winding 102 and the potentiometer 104 and across the secondary winding 106 of the isolating transformer 108, is an electronic tube 116 having an anode or plate 118, a grounded cathode 120, and a grid or control electrode 122 connected to the movable arm of the potentiometer 104. Although omitted for simplicity in Fig. 2, means such as described above, relative to Fig. 1, may also here be included in the grid circuit to prevent excessive grid current through the tube 116. Connected in series in the plate circuit of the tube 116 are a current limiting resistor 124 and one winding 126 of an electromagnetic translating or signaling device, viz. an alarm buzzer designated by its vibrating member 128. The winding 126 is paralleled by a holding condenser 129.

The internal alarm buzzer 128 (so-called as it is normally located within the case of the concentration limit indicator, whereas the alarm device 66 of Fig. 1 is often mounted external to the case) is provided with a second winding 130 connected in series across the secondary winding 106 with a resistor 132 and a suitable half-wave rectifier 134, such as a selenium or copper oxide type rectifier. The pulsating current flowing in the series circuit including the rectifier 134, the resistor 132, and the buzzer winding 130 is sufficient to maintain the alarm buzzer 128 in an operative condition. The intermittent flow of current through the winding 126 and the current limiting resistor 134 during the operative half cycles and the discharging of the condenser 129 on the non-conducting half cycles maintain a substantially constant flow of current through the winding 126 and produces approximately the same effect as if the winding was energized by direct current. It will be understood that if desired, a rectifier may be substituted for the condenser 129 (and the resistor 124 then omitted) as in the case of Fig. 1, for like maintenance of energization of the winding 126, with a reduced plate current through the tube 116.

The windings of the alarm buzzer 128 are so arranged that in the circuit shown by Fig. 2 the magnetic fields which they create are of the same polarity when current flows through them in opposite directions. The half-wave rectifier 134 is phased to conduct on the negative alternations of the voltage supplied by the transformer winding 106 and the tube 116 is phased to be conductive on the positive alternations. Thus, with both windings energized, the armature 128 of the alarm buzzer is pulled toward the pole piece or core of the magnet, but as the voltage supplied by the windings goes through zero twice each cycle, there would still be some tendency for the armature 128 to vibrate at twice the alternating current frequency if the holding condenser 129 was not employed. This condenser supplies current during that part of the cycle when the tube 116 is non-conducting and thus a substantially constant uni-directional magnetic attraction is exerted by the buzzer core which pulls its armature 128 into actual physical contact with the core end and prevents the armature from vibrating. If the winding 126 is deenergized, the armature 128 will produce an aural signal as the pulsating current flowing through continuously energized winding 130 will cause it to vibrate at line frequency. Consequently, aural operation of the buzzer has become dependent on the condition of the electron tube 116.

It is also possible to eliminate the holding condenser and current limiting resistor 124, or other means for keeping the winding 126 energized during non-conducting half cycles. To do this, the half-wave rectifier 134 is so phased that it conducts current of the same positive alternation as the tube 116. In this arrangement, the windings 126 and 130 of the buzzer are opposed so that when both are energized, the magnetic fields they create tend to cancel each other. When cancellation takes place, the armature 128 of the buzzer ceases to vibrate as it is no longer attracted toward its core. When only winding 130 is energized, the buzzer produces an aural signal in the manner described in the preceding paragraph. However, I consider this circuit arrangement to be less preferable as it involves careful phasing and balancing of the current flowing through each buzzer winding.

The tube 116 is preferably a cold cathode glow discharge type gas triode and is biased so as to become substantially non-conducting when the chlorine concentration of the solution flowing through the cell 20 is less than a predetermined minimum and to be conducting when the chlorine concentration is at or in excess of that minimum.

When the switch 114 is closed, power is applied to the circuit and a voltage is induced in the secondary winding 98 of the stepdown transformer 100. If the conductivity of the liquid flowing in the cell 92 is within predetermined values, the impedance of the cell 92 will be sufficiently low to permit an amount of current to flow in the circuit, including the secondary winding 98 and the cell 92, to materially lower the effective impedance of the primary winding 102. This decrease in effective impedance of the primary winding 102 will result in an increase in the potential upon the grid 122. This potential will be in phase with the potential upon the plate 118. The increase in grid potential will cause an increase in the grid current. When this current becomes of sufficient magnitude for transition of the glow discharge to the anode 118, the tube 116 will conduct and current will flow through the winding 126 on each positive half cycle of the applied plate potential. The energization of the winding 126 in cooperation with the continually energized winding 130 will maintain the alarm buzzer 128 in an inoperative condition.

The value of current that must flow through the cell 92 to maintain the tube 116 in a conductive state is determined by the setting of the potentiometer 104. Any material decrease in concentration will result in a material increase in the impedance of the conductivity cell 92. This increase in impedance of the cell 92 results in a decrease in current flow in the secondary winding 98. This decrease in current flow in the secondary winding 98 raises the effective impedance of the primary winding 102 and results in a decrease in current flow therethrough. The decrease in current flow in the primary winding 102 causes a corresponding drop in potential across the potentiometer 104 which lowers the potential on the grid 122 and cuts the tube 116 off providing the potentiometer 104 was set at a value which will just maintain tube conduction at the predetermined minimum chlorine concentration in the solution flowing through the cell 20. When the tube 116 cuts off, the current flow through the winding 126 and the current limiting resistor 124 ceases, and the winding 126 becomes deenergized. The deenergization of the winding 126 results in a sounding of the alarm buzzer 128 which provides an audible indication of the decrease in chlorine concentration below the predetermined low limit.

In the above described circuit the tube 116 is normally in a conducting state while the chlorine concentration is above the low limit. In this condition the winding 126 is continually energized. The winding 126 will become deenergized if the chlorine concentration falls below the predetermined low limit and also if the tube 116 fails to conduct for any other reason, such as tube failure. Thus, if the tube becomes inoperative, due to tube operating failure, the alarm buzzer 128 provides an instantaneous audible indication thereof.

The isolating transformer 108 is provided with another secondary winding 136. Connected to the secondary winding 136 is an indicating lamp 138 to provide a visible indication of the on-off condition of the device.

Fig. 3 illustrates another alternative embodiment of the invention, including a second alternative electric circuit responsive to the changes in chlorine concentration. As described above, with relation to Figs. 1 and 2, there is provided a chlorinator 140 connected by a suitable passage, such as 142, to a throat 144 of an injector in a pipe 146 usually in the form of a rubber hose. The pipe 146 is connected, as above described, to a main (not shown) containing the main body of liquid to be chlorinated. Suitably connected to the pipe 146, by the non-metallic by-pass pipes 148 and 150, is a conductivity cell 152. The conductivity cell 152 is similar in construction to the cell 20 of Fig. 1 and the cell 92 of Fig. 2.

The conductivity cell 92 is connected through the leads 154 and 156 to the secondary winding 158 of a stepdown transformer 160. The high impedance primary winding 162 of the transformer is connected in series with a resistor 164 and a rheostat 166 across the secondary winding 168 of an isolating transformer 170. The resistor 164 has sufficient resistance to prevent a damaging flow of current through the control grid-cathode circuit of the tube 178 in case the resistance of the rheostat 166 is inadvertently reduced to zero.

The primary winding 172 of the isolating transformer 170 is connected to a suitable source of alternating potential, such as the A. C. line 174, through a suitable switch 176. Alternating current is again preferred for the reasons set forth above with relation to Figs. 1 and 2.

Connected in parallel with the series circuit including the primary winding 162, the resistor 164 and the rheostat 166, and across the secondary winding 168 of the isolating transformer 170, is an electronic tube 178 having a plate 180, a grounded cathode 182, and a grid 184 connected to one side of the primary winding 162. Connected in series in the plate circuit of the tube 178 is an energizing coil 186 for an alarm buzzer 188. The tube 178 is preferably a cold cathode glow discharge type gas triode and is biased so as to be conducting when the chlorine concentration of the solution flowing through the cell 152 is less than a predetermined minimum, and to be substantially non-conducting when the chlorine concentration is at or in excess of that minimum. Since in normal monitoring service the tube is non-conducting, current does not flow through the energizing coil 186, and therefore the alarm buzzer 188 will normally be silent.

When the switch 176 is closed, power is applied to the circuit and a voltage is induced in the secondary winding 158 of the stepdown transformer 160. If the conductivity of the liquid flowing in the cell 152 is above a predetermined value, the impedance of the cell 152 will be sufficiently low to permit an amount of current to flow in the circuit including the secondary winding 158 and said cell 152, to materially lower the effective impedance of the primary winding 162. The potential normally existent on the high side of the primary winding 162, i. e., intermediate said winding 162 and the resistor 164 is of a value sufficient to maintain the tube 178 in a non-conducting condition. The grid current is maintained at a sufficiently low value to prevent transition of the glow discharge to the anode 180.

The flow of current that must flow through the cell 152 to maintain the tube 178 in a non-conducting state is determined by the setting of the potentiometer 166. By setting the potentiometer 166 at a value which will just prevent tube conduction for any given conductivity of the liquid in the pipe 146, any material decrease in concentration therein will result in a material increase in the impedance of the cell 152. This increase in impedance of the cell 20 results in a decrease in current flowing through the secondary winding 158. This decrease in current flow in the secondary winding 158 raises the effective impedance of the primary transformer winding 162 and increases the voltage applied to the grid 184 of the tube 178. The increase in potential on the grid 184, in phase with the potential applied to the anode 180, will increase the grid current of the tube 178 to a magnitude sufficient to initiate transition of the glow discharge to the anode 180. When the glow discharge is transferred to the anode 180, the tube 178 will conduct during successive positive half cycles of the plate potential thereon. The conduction of the tube 180 results in a pulsating direct current flowing through the energizing coil 186, which current is sufficient to vibrate the armature 188 of the buzzer and produce an aural alarm.

The isolating transformer is provided with another secondary winding 190 which is connected to a suitable pilot light 192 to provide a visible indication of the on-off condition of the circuit.

In the above described circuit the tube 178 is normally in a non-conducting state while the chlorine concentration in the pipe 146 is above the predetermined low limit. The alarm buzzer 188 will sound only when the chlorine concentration in the pipe 146 drops below the predetermined low limit and tube conduction is initiated.

In order to keep the number of drawings at a minimum all figures have been drawn to illustrate a low concentration limit indicator. It will be obvious to those skilled in the art that by making the minor changes hereinafter described, the apparatus can also be used for indicating when the chlorine concentration exceeds a predetermined maximum value.

The system of Fig. 1 is adjusted for this purpose by substituting normally open contacts for the normally closed contacts 64 of the relay 58 and the potentiometer 38 is adjusted so that the alarm device just ceases to operate (and the tube 62 stops conducting) at the point of maximum desired chlorine concentration.

The system of Fig. 2 is modified for high limit indication by substituting the buzzer 188 of Fig. 3 and its winding 186 for the buzzer 128 and winding 126, and eliminating the condenser 129, rectifier 134, winding 130, and resistor 132. The potentiometer 104 is then adjusted as described in the preceding paragraph.

The system of Fig. 3 may be converted for indicating when a predetermined maximum concentration is reached by substituting the buzzer 128 and winding 126 of Fig. 2 for the buzzer 188 and winding 186, and by installing the condenser 129, rectifier 134, winding 130, and resistor 132 of Fig. 2. The rheostat 166 is then adjusted so that the buzzer just ceases to sound (and the tube 178 starts conducting) at the point of maximum desired chlorine concentration. When modified in this manner the system of Fig. 3 possesses the self-monitoring features of original Fig. 1 and Fig. 2, as it will cause its alarm to sound upon failure of the tube 178 and most other circuit components.

In accordance with the provisions of the patent statutes, I have herein described the principle of operation of this invention, together with the elements which I now consider the best embodiments thereof, but I desire to have it understood that the structure disclosed is only illustrative and the invention can be carried out by other means. Also, while it is designed to use the various features and elements in the combinations and relations described, some of these may be altered and modified without interfering with the more general results outlined.

I claim:

1. In a system for detecting departure of the content of a chemical characteristic of a liquid from a predetermined limiting value, in combination, a conductivity cell comprising electrode means exposed to the liquid and having terminals for electrical connection to said cell, said cell being adapted to provide a change in conductivity between its terminals upon departure of said chemical characteristic of the liquid from said value, a transformer having a secondary in series with said terminals and a primary connected to a source of current so that current is supplied to the cell from said secondary, the primary and secondary of the transformer being electrically coupled so that a change in current flow in the secondary resulting from a change in conductivity in the cell is reflected in a change in current flow in the primary, an electronic tube having a control electrode, and circuit means connected for control by said primary and extending to said control electrode for controlling said tube in response to a predetermined change of current flow through said primary, said electronic tube having an anode and an associated anode circuit, said tube being adapted to provide current flow in said anode circuit only when there is at least a predetermined voltage on the control electrode, said first-mentioned circuit means comprising an impedance connected in series with the aforesaid transformer primary across said source of current, said primary and said impedance constituting a voltage divider and said impedance being connected to said control electrode to impress said predetermined voltage thereon only when the conductivity of the liquid exceeds a predetermined value, and alarm means controlled by said anode circuit and biased to operate unless current is flowing in said anode circuit.

2. In a system for detecting departure of the content of a chemical characteristic of a liquid from a predetermined limiting value, in combination, a conductivity cell comprising electrode means exposed to the liquid and having terminals for electrical connection to said cell, said cell being adapted to provide a change in conductivity between its terminals upon departure of said chemical characteristic of the liquid from said value, voltage dividing means connected across a source of alternating current and comprising an impedance connected in series with another, variable impedance inductively connected to said cell for control of the value of said variable impedance in accordance with the conductivity of the cell, an electrical circuit and means including an electronic tube connected to a part of the voltage dividing means and controlled by changes in the division of voltage resulting from changes in cell conductivity, for effecting a predetermined electrical modification of said circuit in response to the conductivity of said liquid reaching a predetermined level corresponding to a particular chemical characteristic of the liquid.

3. In a system for detecting departure of the content of a chemical characteristic of a liquid from a predetermined limiting value, in combination, a conductivity cell comprising, electrode means exposed to the liquid and having terminals for electrical connection to said cell, said cell being adapted to provide a change in conductivity between its terminals upon departure of said chemical characteristic of the liquid from said value, a transformer having a secondary winding connected to said terminals and a primary winding connected across a source of alternating current in series with an impedance to form a voltage divider, an electronic tube having a control electrode, and circuit means connected to said voltage divider and said control electrode for controlling the current flow through said tube in response to change in the division of voltage resulting from changes in cell conductivity.

4. The system of claim 3 in which the impedance includes a resistance and the electronic tube has a cathode, said means for controlling current flow comprising a circuit connecting the resistance between the control electrode and the cathode, said cathode being connected to that end of the resistance which is more remote from the primary winding in the voltage divider, and means in said last mentioned circuit for impeding current flow between said control electrode and cathode from said alternating current source.

5. In a system for indicating departure of the content of a chemical characteristic of a liquid from a predetermined limiting value, in combination, a conductivity cell comprising electrode means exposed to the liquid and having terminals for electrical connection to said cell, said cell being adapted to provide a change in conductivity between its terminals upon departure of said chemical characteristic of the liquid from said value, voltage dividing means connected across a source of current and comprising an impedance connected in series with another, variable impedance controlled in value by said cell and isolated from conductive connection to said cell, an electronic tube having a control electrode and an output, and circuit means connected for control by a part of said voltage dividing means and extending to said control electrode to control said tube for effecting predetermined change in said tube output in response to a predetermined change in the division of voltage in said voltage dividing means.

6. A system as defined in claim 5 in which one of said impedances comprises impedance means adjustable in impedance value independently of the control of the variable impedance by the cell, for correspondingly independently changing the voltage across the aforesaid part of the voltage dividing means which controls the tube.

7. A system as defined in claim 3 in which the impedance includes a resistance having an adjustable tap and in which the tube-controlling circuit means has two connections to said voltage divider at localities separated to impress a part of the voltage of said divider on the circuit means, said voltage divider also having two connections separated by the primary and at least a portion of said resistance and extending to said source of current for establishing the voltage across the divider, and one of said four connections being connected to said adjustable tap, for effecting adjustment of the aforesaid part of the voltage which is impressed on the circuit means, independently of change in the division of voltage by change in cell conductivity.

8. A system as defined in claim 3 in which the electronic tube comprises a cold-cathode gas tube having an output circuit, said circuit means effecting and interrupting current flow in said output circuit respectively in accordance with presence and absence of predetermined voltage impressed on said tube from said voltage divider, and which inclues alarm means controlled by said output circuit, for operation to provide an alarm upon change in division of voltage in said divider occasioned by departure of the chemical characteristic from the limiting value.

JOHN R. MacKAY.

References Cited in the file of this patent

UNITED STATES PATENTS

| Number | Name | Date |
|---|---|---|
| 1,610,179 | Thompson | Dec. 7, 1926 |
| 2,475,023 | Grimes | July 5, 1949 |
| 2,482,078 | Wallace | Sept. 13, 1949 |

OTHER REFERENCES

Electronics, page 162, December 1, 1943